Jan. 28, 1964 L. S. HOFFMAN 3,119,586
CHRISTMAS TREE STAND
Filed Feb. 27, 1961 2 Sheets-Sheet 2

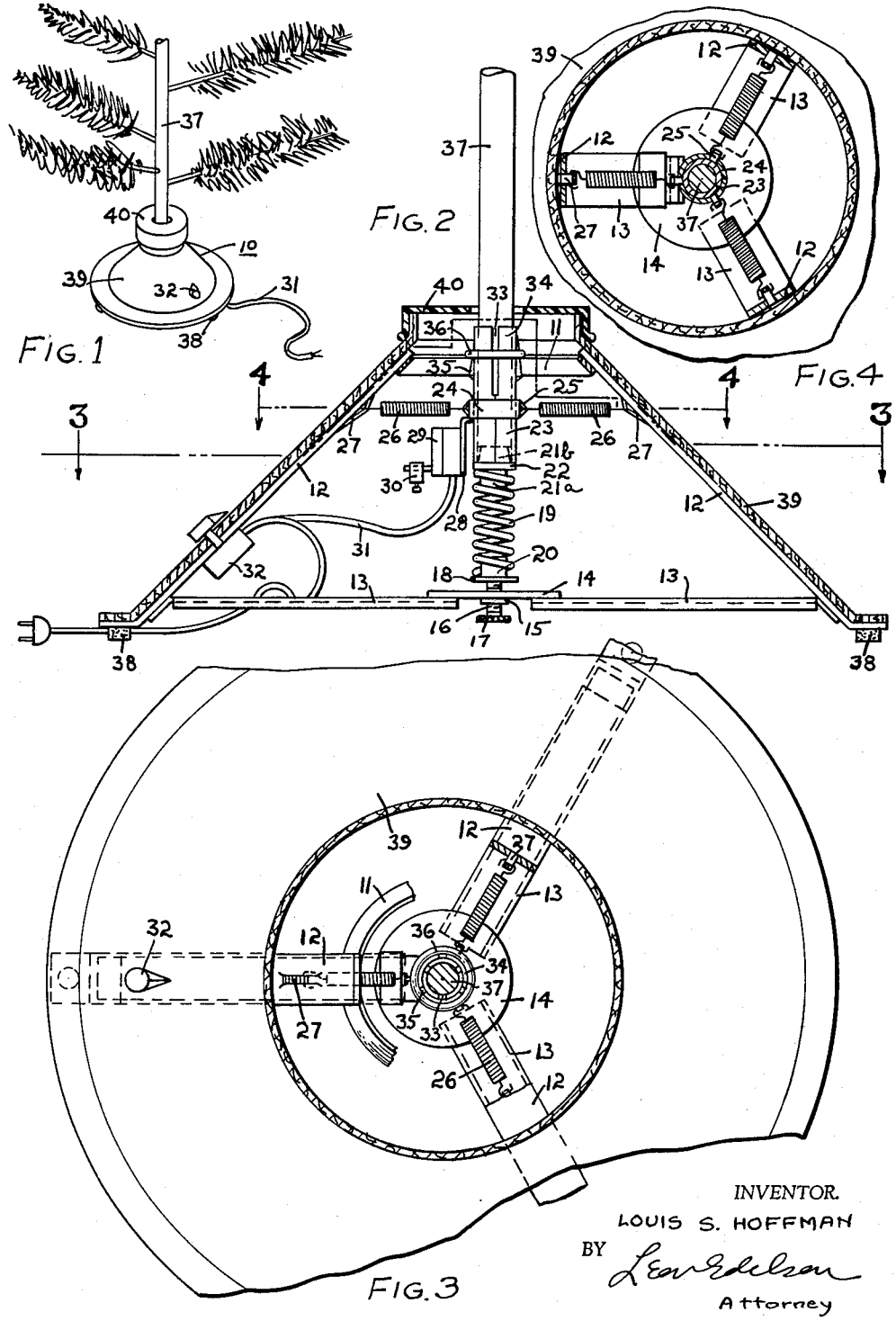

INVENTOR.
LOUIS S. HOFFMAN
BY
Attorney

United States Patent Office 3,119,586
Patented Jan. 28, 1964

3,119,586
CHRISTMAS TREE STAND
Louis S. Hoffman, 302 N. Lancaster Ave.,
Margate City, N.J.
Filed Feb. 27, 1961, Ser. No. 91,936
2 Claims. (Cl. 248—44)

This invention relates generally to tree stands, and more particularly relates to tree stands which simultaneously provide a stable supporting base for the tree and include means for imparting a shimmering motion to the branches of the tree. The shimmering of the branches is visually pleasing and greatly enhances the appearance of Christmas trees, whether they be of the natural spruce variety or of the artificial aluminum type. Moreover, the shimmering of the tree branches produces a low level rustling sound suggestive of a breeze blowing through the tree.

Basically, the shimmering effect is produced by a resilient suspension system contained within the tree stand base and by means of which the tree itself is supported. The tree and the suspension system are set into relatively low-amplitude low-velocity vibration by means housed within the base, the vibration components being majorly vertically through the trunk of the tree but also including subsidiary modes of a somewhat random nature which introduce small variations in the shimmer pattern and result in a more natural effect. Adjustment means are also provided for accommodating the resilient suspension system to different trees of varying mass since the total mass of the vibrating system affects the amplitude and mode of vibration. Accordingly, it is a primary object of this invention to provide a novel tree stand which functions both as a supporting base and as a means for imparting a vibratory motion to the tree to induce a shimmering of the branches thereof.

Another object of this invention is to provide a novel tree stand as aforesaid which includes means for adjustably controlling the period of vibration of the resilient tree suspension so as to accommodate a wide range of trees of different sizes and weights.

A further object of this invention is to provide a novel tree stand of the described type which is of relatively simple mechanical construction and therefore characterized by a long and trouble-free usable life.

Yet another object of this invention is to provide a novel stand device for imparting oscillations to an article secured thereto, such as a Christmas tree, which is ornamental as well as functional and which enhances the appearance of the supported article.

The foregoing and other objects of the invention will become apparent from a reading of the following specification in conjunction with an examination of the appended drawings, wherein:

FIGURE 1 is a perspective view of one form of the novel tree stand according to the invention, shown with a tree supported thereby;

FIGURE 2 is an enlarged vertical section through a tree stand of the type shown in FIGURE 1 and revealing details of the internal construction of the stand and resilient suspension unit;

FIGURE 3 is a horizontal cross section through the stand apparatus shown in FIGURE 2 as would be seen when viewed along the irregular broken line designated 3—3 of that figure;

FIGURE 4 is a partial horizontal cross section through the structure of FIGURE 2 as would be seen when viewed along the lines 4—4 thereof;

Figure 5:
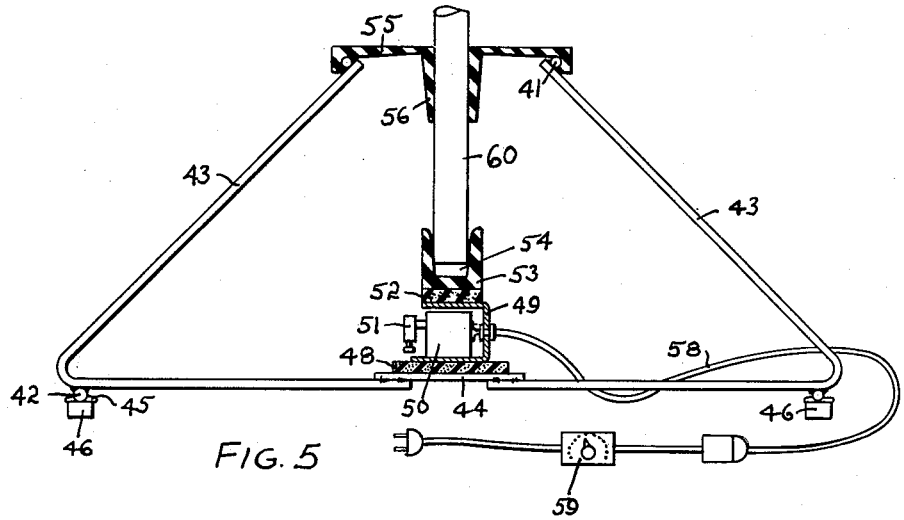
Figure 6:
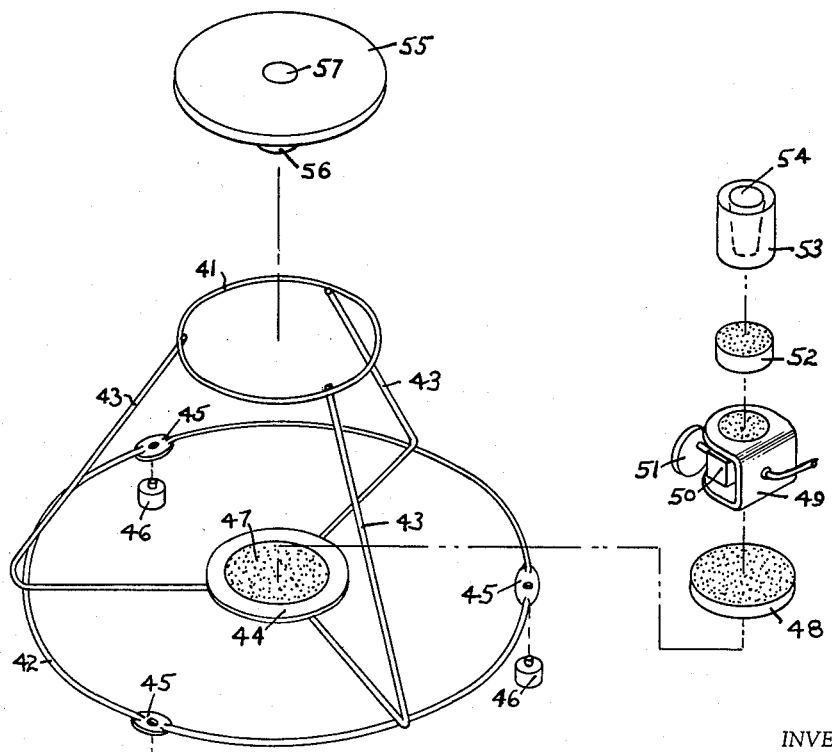

FIGURE 5 is a vertical sectional view of another form of the tree stand according to the invention, some parts being shown in elevation and others in section in order to more clearly illustrate the structure and organization thereof; and FIGURE 6 is an exploded perspective view of the modified form of apparatus seen in FIGURE 5 and with some parts laterally displaced and vertically separated from the main frame to more clearly illustrate the component structure thereof.

In the several figures, like elements are denoted by like reference characters.

Referring now to FIGURES 1 through 4, it will be seen that the tree stand generally designated as 10 includes a main frame consisting of an upper circular annular collar 11 from which downwardly divergingly extend three rectangular bar side members equally spaced about the collar periphery and secured thereto at the upper ends of the side members 12, as for example by tack welding. Secured to and extending inward from each of the side members 12 proximate the lower ends thereof are channel members 13, the inner end of the channel members 13 terminating at and being each secured to the under side of a central circular disc 14 positioned below and vertically coaxial with the upper annular collar 11. The lower disc 14 is centrally vertically apertured and provided with a threaded reinforcing bushing 15 through which is vertically threadedly engaged an adjusting bolt 16 provided at its lower terminus with a knurled adjusting knob 17.

Secured to the upper end of the adjusting bolt 16 is a base plate 18 upon which is seated the lower end of a compression coil spring 19, the coil spring being maintained in center position on the base plate 18 by means of the plug member 20 secured to the latter and extending upward into the coil spring 19. Disposed at the upper end of the coil spring 19 is a double plug member 21 having a radially extending peripheral flange 22 projecting therefrom which divides the double plug member 21 into a lower plug 21a seated downward within the upper end of the compression coil spring 19 to bring the latter into engagement with the under side of the flange 22, and an upper plug section 21b projecting close-fittingly upward into the open end of a circular cylindrical sleeve 23 which latter is seated upon the upper surface of the flange 22. Secured centrally peripherally about the cylindrical sleeve 23 is a mounting collar 24 having pressed outward from the side walls thereof three tabs 25 which provide anchor points for one end of each of the three horizontally disposed extension springs 26, the opposite ends of these springs 26 being anchored to similar tabs 27 pressed inward from the side members 12. Also secured to the mounting collar 24 is a depending bracket 28 which carries a gear motor 29 to the shaft of which is fixedly secured an eccentric weight 30, the motor 29 being energizable by means of the line cord 31 and combination switch and rheostat 32.

The portion of the cylindrical sleeve 23 which extends upward above the mounting collar 24 is vertically slotted, as at 33, at three points about the sleeve periphery to provide three fingerlike sections 34. Each of these finger sections has bent outward from the surface thereof a tapered loop formation 35, the finger sections 34 and loop formations 35 forming a collet arrangement openable and contractible radially by means of the vertically shiftable slip ring 36. It is readily observable that the tree trunk 37 may be slipped downwardly into the collet-top cylindrical sleeve 23 when the slip ring 36 is shifted vertically upward to allow the finger sections 34 to expand radially outward from one another, and that the trunk 37 is firmly secured within the sleeve 23 by the simple expedient of shifting the slip ring 36 vertically downward so that it rides onto the tapered loop formations 35 and forces the finger sections 34 radially inward to firmly grasp and secure the trunk 37. The weight of the tree whose trunk 37 is secured within the collet sleeve 23 is supported by the coil compression spring 19, and lateral stability is provided by the radially extending substantially horizontal extension springs 26. Trees of different weights may be compensated for by varying the vertical position of the compression spring 19 through the agency of the adjusting bolt 16 and knob 17, so that the extension springs 26 may be maintained in substantially a horizontal plane.

The several springs 19 and 26, together with the cylindrical sleeve 23 and the tree which is clamped therewithin may be set into vibrational motion by energization of the motor 29 through the switch and line cord 31 and 32. Energization of the motor 29 causes rotation of the shaft to which is affixed the eccentric weight 30, the presence of the weight 30 establishing a dynamically unbalanced set of forces on the motor 29 and producing vibration of the latter. The vibration of the motor structure is, of course, coupled to the suspension system through the bracket 28 and mounting collar 24. The amplitude and frequency of vibration imparted to the resilient spring suspension system are determined by the constants of the spring suspension system and the mass associated therewith, together with the degree of dynamic unbalance provided by the eccentric weight 30 and the rate of rotation of the eccentric weight 30 as governed by the speed of the motor 29 which is in turn controlled by the setting of the rheostat 32. In general, for a practical range of varying tree sizes and weights, the constants of the spring suspension system may be determined and fixed so that the only points of adjustment requiring some consideration are the mass and degree of eccentricity of the eccentric weight 30 and the setting of the rheostat 32. Moreover, it has been found that the constants of the eccentric weight 30 can be determined and established in such a manner that complete control of the vibrating system may be exercised merely by a proper setting of the rheostat 32.

The tree stand device is completed by the resilient mounting feet 38 secured to the underside of the lower terminus of each of the side members 12, a decorative cover shell 39 of generally truncated conical form, and a snap-on cover cap 40 centrally apertured to allow through passage of the tree trunk 37 and fitting snugly downward peripherally about the upper terminus of the decorative shell 39.

Turning now to the modified embodiment of the invention shown in FIGURES 5 and 6, it will be observed that the structural organization is generally similar to that seen and already described in connection with the showings of FIGURES 1 through 4. The frame is generally of truncated conical pyramidal form and includes a resilient suspension system having a lower resilient thrust support and an upper resilient lateral support. Specifically, the frame is made generally of round bar stock or very heavy wire and includes an upper circular rim 41, a lower circular rim 42 of larger diameter than the upper rim, three V-shaped angle members 43 secured at their upper ends to the upper circular rim 41 and at their lower interior ends to a central disc 44 and to the lower circular rim 42 proximate the vertices of the V-shaped angle members 43. The central disc 44 is, of course, concentrically positioned relative to the upper and lower circular rims 41 and 42 respectively. The lower circular rim 42 is apertured and flattened as at 45 to provide snap-in mounts for the rubber mounting feet 46.

Secured flatwise upon the upper surface of the central disc 44 by means of the adhesive 47 is a resilient pad 48, and cemented to the upper surface of the pad 48 is the yoke 49 which carries the motor 50. Fixedly secured to and revoluble with the motor shaft is an eccentric weight 51 which serves the same purpose as the eccentric weight 30 previously described in connection with the embodiment illustrated in FIGURES 1 through 4. Adhesively secured to the upper surface of the yoke 49 is a second pad 52 which in turn has secured to its upper surface the resilient cylindrical element 53 formed with an axially tapered socket 54 extending from the upper surface thereof for a distance downward into the cylindrical element 53. Snap-fitted over the upper circular rim 41 is a resilient diaphragm 55 formed with a central hub 56 provided with a through bore 57, the hub 56 and bore 57 being oriented perpendicularly to the plane of the diaphragm 55 and extending downward therefrom coaxially with the socket 54 and cylindrical rubber element 53. The diameter of the bore 57 is chosen to be somewhat smaller than the diameter of the tree trunk 60 so that the latter must be wrung or twisted downward through the bore to thereby insure a firm engagement between the central hub 56 of the diaphragm 55 and the tree trunk 60. The trunk 60 is, of course, projected downward until it seats firmly into and is grasped by the tapered socket 54 of the element 53, thus providing a bottom thrust support for the tree trunk 60 and also a lateral stabilizing effect.

The motor 50 is energizable by means of the line cord 58 which may be used directly or plugged into an auxiliary cord containing in series therewith a rheostat 59, the rheostat 59 providing the motor control function previously described in connection with the rheostat 32 illustrated in FIGURE 2. Energization of the motor 50 causes rotation of the eccentric weight 51 which latter causes the entire motor 50 and yoke 49 to vibrate. The vibration is coupled through the pad 52 and cylindrical socketed element 53 to the tree trunk or shaft 60, which latter is then set into vibratory motion in the desired manner. The resilient pad 48 between the motor yoke 49 and the central disc 44 is required to provide the equivalent function of the compression spring 19 in the device of FIGURE 2. The governing factors operative to control amplitude and frequency of vibration in the device of FIGURES 5 and 6 are the resilience of the diaphragm 55, the resilience of the two pads 48 and 52 and the mass and eccentricity of the eccentric weight 51. While the pad 52 is shown as being made of a sponge rubber or foamed plastic type of material, it is possible that this pad may be entirely eliminated if too much resilience is introduced thereby and results in a partial decoupling of the vibrating motor system from the tree trunk 60. Similarly, the resilient pad 48 may be more or less resilient and of greater or lesser vertical height as determined by the particular result desired in application.

Comparison of the embodiment of FIGURES 5 and 6 with that of FIGURES 1 through 4 reveals that while the components themselves are physically different, the underlying concept is the same in both. That is, the resilient diaphragm 55 performs the same function as the three radially disposed extension springs 26, and the resilient pads 48 and 52 perform the same function as the compression spring 19. The rheostats 32 and 59 are, of course, provided for the same purpose, namely that of controlling the rotational speed of the eccentric weights 30 and 51 respectively. The open framework of the embodiment illustrated in FIGURES 5 and 6 may if desired be covered in any suitable manner, as for example by a wrapping of fabric or crepe paper or by employing a more permanent type of decorative shell, perhaps of the type shown in FIGURES 1 through 4 at 39.

Having now described my invention in connection with particularly illustrated embodiments thereof, it will be apparent that variations and modifications may occur from time to time to those persons normally skilled in the art without departing from the essential scope or spirit of the invention, and, accordingly, it is intended to claim the same broadly as well as specifically as indicated by the appended claims.

What is claimed as new and useful is:

1. A tree stand device comprising in combination, a base for providing a stable mechanical support for a tree, a tree suspension system coupled to said base including a vertically oriented compression coil spring the lower end of which is supported by said base and the upper end of which is secured to the bottom of and supportingly carries a collet-top cylindrical sleeve adapted to receive and clamp therein the lower end of a tree trunk, said suspension system also including a plurality of substantially horizontally extending extension coil springs disposed angularly about the said cylindrical sleeve at an elevation above the upper end of said compression coil spring with one end of each extension spring coupled to the sleeve and with the other end of each of said extension springs coupled to the said base, and an electrically energizable motor rigidly coupled to said cylindrical sleeve effective when energized to induce vibratory motion of a tree clamped in said collet-top cylindrical sleeve, said vibratory motion being induced by a weight eccentrically secured to the motor shaft for rotation therewith.

2. A tree stand device comprising in combination, a base for providing a stable mechanical support for a tree, a tree suspension system coupled to said base including a vertically extending resilient pad the undersurface of which is secured to said base and the upper surface of said pad being secured to the lower end of a yoke which carries an electrically energizable motor having an eccentric weight secured to the motor shaft, the upper end of the motor yoke having secured thereto and extending vertically upward therefrom a socketed receptacle adapted to receive and securely hold the lower end of a tree trunk, and a resilient diaphragm spaced above said socketed receptacle and carried by said base having a central hub including a vertical aperture coaxially aligned with the socket of the socketed receptacle and through which hub aperture the trunk of a tree is adapted to close-fittingly pass downward for seating engagement in said socketed receptacle.

References Cited in the file of this patent

UNITED STATES PATENTS

| | | |
|---|---|---|
| 659,089 | McKinney | Oct. 2, 1900 |
| 1,617,126 | Kurten | Feb. 8, 1927 |
| 1,650,630 | Klein | Nov. 29, 1927 |
| 1,752,266 | Sloan | Mar. 25, 1930 |
| 1,911,636 | Meitzler | May 30, 1933 |
| 2,485,460 | Rocco | Oct. 18, 1949 |
| 2,905,414 | Zierden | Sept. 22, 1959 |